United States Patent [19]

Op de Beek et al.

[11] Patent Number: 4,555,760

[45] Date of Patent: Nov. 26, 1985

[54] METHOD AND COMPUTER TOMOGRAPHY DEVICE FOR DETERMINING A TOMOGRAPHIC IMAGE WITH ELEVATED RESOLUTION

[75] Inventors: Johannes C. A. Op de Beek; Steven Lobregt, both of Eindhoven, Netherlands

[73] Assignee: U.S. Philips Corporation, New York, N.Y.

[21] Appl. No.: 491,516

[22] Filed: May 4, 1983

[30] Foreign Application Priority Data

May 12, 1982 [NL] Netherlands ............... 8201942

[51] Int. Cl.⁴ .................................... G06F 15/42
[52] U.S. Cl. ................................. 364/414; 378/901
[58] Field of Search .................. 364/414; 378/901; 250/363 SR, 363 SA, 363 SC

[56] References Cited

U.S. PATENT DOCUMENTS

| | | | |
|---|---|---|---|
| 4,051,379 | 9/1977 | Zacher, Jr. ................ | 250/445 T |
| 4,066,903 | 1/1978 | Le May .................... | 378/901 X |
| 4,088,887 | 5/1978 | Le May .................... | 378/901 X |
| 4,326,252 | 4/1982 | Kohno et al. ............. | 364/414 |
| 4,365,339 | 12/1982 | Pavkovich et al. ....... | 364/414 X |
| 4,398,251 | 8/1983 | Le May .................... | 364/414 |
| 4,403,289 | 9/1983 | Lux et al. ................. | 378/901 X |
| 4,446,521 | 5/1984 | Inouye ..................... | 364/414 |
| 4,460,961 | 7/1984 | Op de Beek .............. | 364/414 |

Primary Examiner—Jerry Smith
Assistant Examiner—Louis Woo
Attorney, Agent, or Firm—Jack E. Haken

[57] ABSTRACT

A computer tomography device, in which the row of detectors has been rotated through the quarter of a detector angle ($\Delta\psi/4$) with respect to the X-ray source. The invention filters selected parallel measurement values which were measured in a single direction instead of doing so with all the selected measurement values measured in parallel and antiparallel directions. The calculating time required for filtering is reduced by a factor of 2 and the values can be pipeline processed.

3 Claims, 6 Drawing Figures

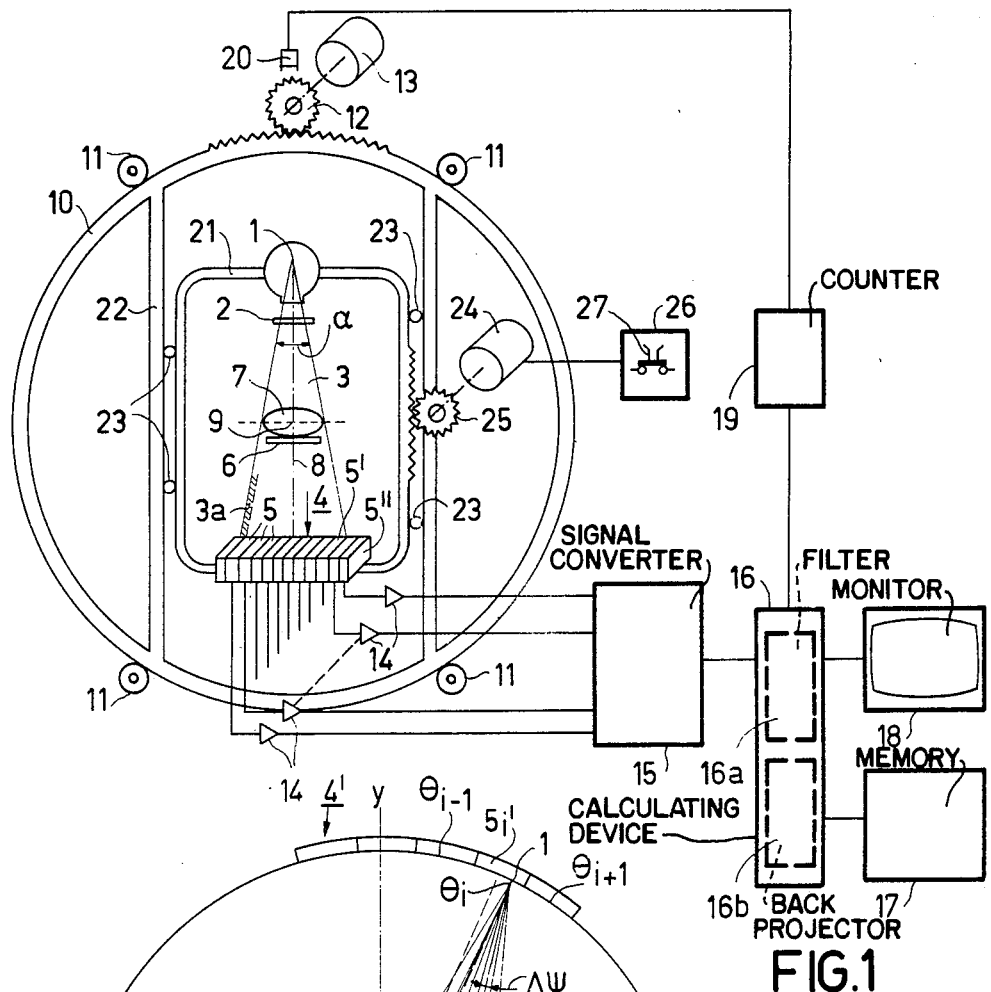
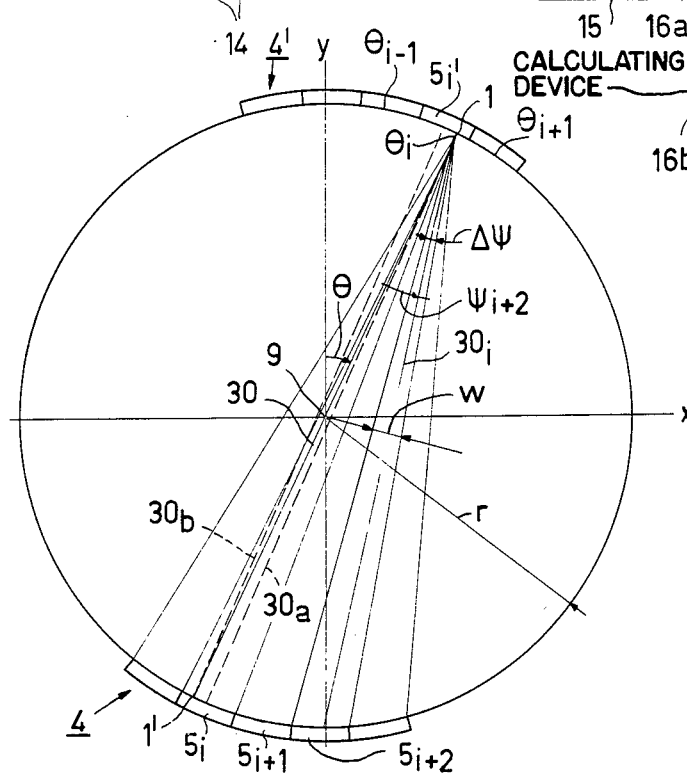
FIG.1
FIG.2

METHOD AND COMPUTER TOMOGRAPHY DEVICE FOR DETERMINING A TOMOGRAPHIC IMAGE WITH ELEVATED RESOLUTION

The invention relates to a computer tomography device for determining a radiation attenuation distribution in a plane of a body. Such a device comprises at least one source for producing a flat fan-shaped beam of penetrating radiation, by means of which the body is irradiated from a multitude of directions passing through a central point and regularly distributed over 360° along a plurality of measuring paths diverging from the source and located in the plane. The device further comprises a series of detectors for detecting radiation which has passed through the body and for supplying therefrom a group of measuring data for each direction, each group of measuring data being a measure of the attenuation of the radiation in the body which occurs along the plurality of diverging measuring paths. Radiation emitted from the source and passing through the central point strikes a detector at the centre of a row spanned by the fan-shaped beam halfway between the centre and the edges thereof. Each measuring path has a maximum width a, measured along the line which is at right angles to the measuring path and passes through the central point.

The device also comprises a calculating device having:
- a memory for storing the measuring data and for reordering the groups of measuring data to derive sub-groups of measuring data, which have been measured along parallel measuring paths;
- a filtering device for carrying out either a convolution or a Fourier transformation, a filtering and a Fourier back transformation on each subgroup of measuring data;
- a backprojection device for distributing and adding values of each subgroup of filtered measuring data respectively over and to a matrix of memory cells of the memory forming an image matrix; and
- a display device for displaying the content of the image matrix.

The invention further relates to the method of determining a radiation attenuation distribution in a plane of a body, in which the body is irradiated from a multitude of directions passing through a central point and distributed over 360° with a flat fan-shaped beam of penetrating radiation which diverges from a point to determine a group of measuring data which, for each measuring direction, have been measured along a plurality of measuring paths located in the plane of the body and are a measure for the attenuation of the radiation in the body occurring along the plurality of diverging measuring paths. Subgroups are derived from the groups of measuring data, which subgroups contain data measured along parallel measuring paths, whereupon each subgroup is filtered and is backprojected onto an image matrix.

Such a method and computed tomography device are known from U.S. Pat. No. 4,051,379, in which the row of detectors is arranged asymmetrically to a central line which passes through the central point and the X-ray radiation source in order to increase the resolution. The measuring data is measured along parallel measuring paths and is combined in a subgroup and further processed in the manner described, for example, in U.S. Pat. No. 3,983,398. The measuring data measured from the various directions must then be stored before it can be further processed and the radiation source must make such a large rotation about the central point that all the measuring data associated with a subgroup of parallel measuring paths are determined before the subgroup of measuring data can be filtered and backprojected. An increase in the resolution may be obtained by doubling of the number of measuring paths per subgroup only at the expense of increasing the required storage space, delaying the beginning of the processing of the measuring data, and utilizing a larger number of calculating operations.

The invention has for its object to provide a computed tomography device, in which an image with a high resolution is obtained with a shorter waiting time before the processing of the measuring data is started and in which the filtering is carried out much more rapidly.

The computed tomography device according to the invention reorders the groups of measuring data measured over 360° into two subgroups of measuring data for each measuring direction. The measuring data in one subgroup is measured in a direction opposite to that in which the measuring data of the other subgroup is measured. The distance between two measuring paths associated with two adjacent data elements in a subgroup is larger than $\frac{1}{2}$ a and the filtering device has a frequency response curve with a maximum for the frequency $(2a)^{-1}$ and zero points for the frequencies 0 and $1/a$. The backprojecter distributes and adds pairs of interleaved subgroups of filtered measuring data with an interpolation distance of $(2a)^{-1}$ into the image matrix. The number of memory cells in the image matrix must be larger than the square of the number of detectors spanned by the beam of diverging radiation.

In the computer tomography device according to the invention, the filtering of a subgroup may be started as soon as the source has rotated around the central point more than the apical angle enclosed by the diverging beam of radiation. The storage of the groups of measuring data thus requires much less storage space than the prior art. The filtering of the subgroups requires less calculating time because the number of data elements per subgroup is halved.

The filtering behavior of a computer tomography device is determined by the frequency response curve of the filtering device and the backprojection device. In the present invention the frequency response curve of the filtering device has zero points at the frequencies zero and $1/a$ (a being the maximum distance between two measuring paths in a subgroup) and has a maximum at the frequency $(2a)^{-1}$. In the prior art the filtering device simultaneously filters the measuring data elements which were measured along parallel and antiparallel measuring paths and had a frequency response curve $Q(R)$ which is determined by $Q(R)=|R|$ for the frequency $R \leq 1/a$. If a linear interpolation is used in the present invention, the backprojection device has a frequency response curve represented by $\sin c^2(\pi \cdot \frac{1}{2}a \cdot R)$, R being the frequency to be imaged in the image matrix. Consequently, there is a zero point for the frequency $R=2/a$.

It can also be recognized that, if the size of an image element is approximately equal to the maximum distance a between the measuring paths, high frequencies in the image are limited by the frequency response curve of the backprojection device and the filtering behaviour of the image matrix. In computed tomography device of the invention, the filter produces a considerable attenuation at high frequency, but this is not a serious limitation because the backprojection device passes these frequencies only in attenuated form.

In the computer tomography device according to the invention, an optimum high resolution is attained with a given number of detectors with a minimum calculating time to carry out the filtering of the measuring data and with a memory adapted to a minimum extent with respect to its size.

The method according to the invention is characterized in that two subgroups are selected from the groups of data elements for each measuring direction. Data of the first subgroup is determined along measuring paths which are antiparallel to measuring paths along which the measuring elements of the second subgroup are determined. In each subgroup the distance between two measuring paths is at most a and is larger than $\frac{1}{2}$a. Filtering of each subgroup is carried out with a filtering device the frequency response curve of which has a maximum at the frequency $(2a)^{-1}$ and zero points at the frequencies zero and $1/a$. Each first subgroup of filtered data is interleaved with the data elements of the associated second subgroup and the interleaved subgroups are backprojected. The interpolation distance between the measuring data is $(2a)^{-1}$.

The invention will be described with reference to embodiments shown in the drawing, in which:

FIG. 1 is a computed tomography device according to the invention;

FIG. 2 illustrates the measuring arrangement of the device shown in FIG. 1,

Figure 3:
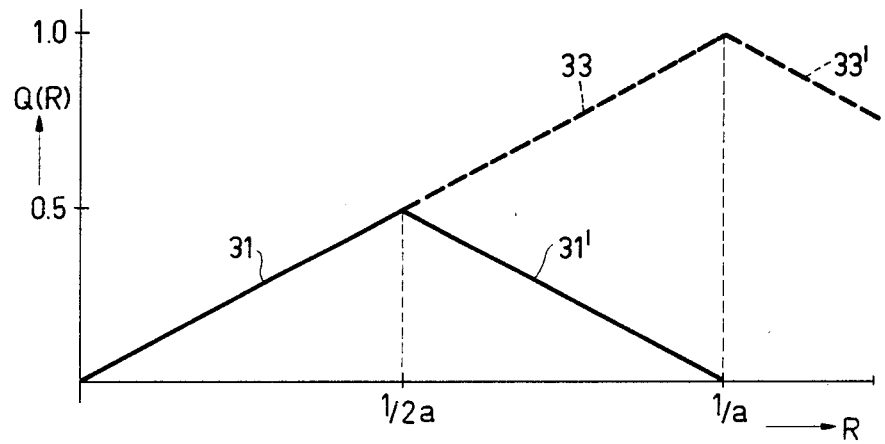
FIG. 3 shows frequency response curves of a filtering device for computed tomography devices.

A computed tomography device of the kind shown diagrammatically in FIG. 1 comprises a radiation source 1, which may preferably be an X-ray tube, for producing a flat beam 3 of X-ray radiation to be diaphragmed by a diaphragm 2 and diverging through an angle $\alpha$, which beam may have a thickness of 3 to 35 mm. The radiation beam 3 is incident upon a row 4 of separate detectors 5, which measure each radiation reaching the relevant detector 5 through a measuring path 3a. The width of a measuring path and the relative distance of the measuring paths determine the spatial accuracy with which an object 7 lying on a table 6 is scanned and is constructed. In order to increase this accuracy (resolution), the detector row 4 is arranged asymmetrically to a central ray 8, which passes from the source 1 through a central point 9.

In a preferred embodiment, the central ray 8 strikes the detector 5 at the centre of the row 4 halfway between the centre and the edge of the detector 5, so that $\frac{1}{4}$ of the detector 5 lies on one side and $\frac{3}{4}$ of this detector lies on the other side of the central ray 8. The detector row 4 comprises, for example, 576 detectors 5, $\alpha$ being $= 43.2°$ and the distance between the source 1 and the detector row 4 amounting to 1 m. The row 4 of detectors 5 may be composed, for example, of an elongate gas-filled ionization chamber, in which flat electrodes are arranged in a row parallel to each other.

The assembly of radiation source 1 and detector row 4 is mounted on a supporting frame 10 which is arranged so as to be rotatable about the central point 9 so that a layer of the object 7 can be irradiated in different directions in a plane with the radiation beam 3. The supporting frame 10, which is guided with the aid of bearings 11, is driven by means of a motor 13 in a transmission gear 12. The drive may be continuous, but also intermittent, the radiation source 1 emitting in the first case preferably a radiation pulse.

The detectors 5 supply measuring signals which are applied through an amplifier 14 to a signal converter 15, in which the measuring signals are digitized, after which the signals are supplied to a calculating device 16. The measuring signals are corrected by the calculating device 16 for "offset", logarithmized and calibrated with reference to logarithm and calibration tables present in a memory 17, after which the measuring values are stored in the memory 17. An image matrix of the radiation attenuation distribution to be determined by the calculating device 16, in which the measuring data are processed by a filtering device 16a, which carries out either a convolution or a Fourier transformation, a filtering and a back transformation, and then by a backprojection device 16b, which distributes the filtered measuring data over memory cells of an image matrix stored in the memory 17, can be displayed on a display device 18.

A counter 19 counts the number of pulses which is generated by a pulse generator 20 during rotation of the supporting frame 10 so that a counter position of the counter 19 is a measure for the orientation of the supporting frame 10 and hence is a measure for the angular rotation of the successive measuring directions.

It has proved advantageous to choose the distance between the radiation source 1 and the object 7 so that it can be adapted to the size of the object 7. Therefore, the radiation source 1 and the detector row 4 are mounted on a support 21, which can be displaced along guiding rails 22 on bearings 23 and by means of a transmission gear 25 coupled with a motor 24. By means of a switch 27, the motor 24 can be driven through a control circuit 26.

For the sake of clarity, in FIG. 2 the arrangement of radiation source 1 and detector row 4 is shown in an x-y co-ordinate system. The measurement value to be supplied by the detector $5_i$ in the position shown is assumed to be measured along a measuring path 30a which passes through the source 1 and the centre of the detector $5_i$. The distance between the measuring paths at the area of the central point 9 is approximately $W = r \cdot \Delta \psi$, r being the distance between the source 1 and the central point 9 and $\Delta \psi$ being the angle enclosed between two measuring paths. It can be recognized that after rotation of the source 1 with detectors 5 through an angle $\Delta \psi$ in the direction $\theta$ the measuring path associated with a measurement value and situated between the source 1 and the detector $5_{1+i}$ is parallel to the measuring path between the source 1 and the detector $5_i$ before the rotation. Subgroups of data elements are selected which are measured along parallel paths from the groups of signals measured in the different positions $\theta_i$. The distance between two adjacent paths amounts to approximately $r \cdot (\cos \psi_i) \Delta \psi, \psi$ being the angle enclosed by the central ray 30 and the connection line $30_i$ between the source 1 and a detector $5_i$. Such a subgroup is filtered in the calculating device 16 (FIG. 1), using a filter having a cut-off frequency $R_{max}$ of $(2a)^{-1}$ and a filter function $Q(R)$ which may (as indicated in FIG. 3) be a straight line 31.

In FIG. 3, the spatial frequency is plotted on the abscissa and the amplitude of the filter function Q(R) is plotted on the ordinate. The example shown in FIG. 3 of a frequency response curve 31 (cut-off frequency $(2a)^{-1}$) of a filtering action of the calculating device 16 is according to the prior art (for example, in "Indian Journal of Pure and Applied Physics", Vol. 9, November 1971, pp. 997–1003). The curves 31 and 33 shown in FIG. 3 are parts of periodic functions resulting from a discreet Fourier transformation. These functions will be described more fully hereinafter. The filtering to be effected should be tuned to the sampling frequency and is determined by the distance a between the measuring paths and is inversely proportional thereto. It should be appreciated that thereby also the resolution of the image to be reconstructed of an object 7 is defined.

In order to increase the resolution, the prior art suggested that the detector row 4 be disposed asymmetrically to the central ray 30 (FIG. 2) of the source 1, while this ray, passing through the central point 9, strikes the detector $5_i$, $\frac{1}{4}$ of the detector $5_i$ lying on one side of the central ray 30 and the remaining $\frac{3}{4}$ part of the detector $5_i$ on the other side of the ray 30. The proposed asymmetrical arrangement of the detector $5_i$ is obtained by rotation of a detector $5_i$ through a quarter of the aperture angle ($\Delta\psi/4$), around the source 1. The detector $5_i$ first supplies a value measured along path 30a. After a scan of the source 1 and the detector row 4 through an angle 0 of 180°, detector $5_i$ supplies a value measured along path 30b. Paths 30a and 30b are parallel and have a relative distance a/2 (at the area of the centre of rotation 9). Subgroups of measurement values can be selected from the groups of measurement values made in the different source positions $O_i$ and $O_i + 180°$ so that the distance between two adjacent measuring paths is r·(cos $\psi_i$)·$\Delta\psi/2$. According to the aforementioned publications, such a subgroup is filtered with the response curve 33 indicated by a broken line in FIG. 3. The cut-off frequency is in this case 1/a, which would mean a doubling of the resolution. On the other hand:

a large memory is required to store all the measurement values (these are at least 250×223 measurement values if the number of detectors is 250 and the number of source positions is $\theta_i$ 180° for a rotation of 180°);

ii the filtering cannot be started until all the required measurement values have been stored and selected (duration a few seconds) and iii the required calculating operations for the filtering are doubled and consequently require a longer calculating time or a larger calculating capacity.

In FIG. 3, the frequency response curve Q(R) of the calculating device according to the invention is indicated by lines 31 and 31'. In the filtering according to the invention, the measurement values of a subgroup with the same measuring direction are also processed. The subgroup of measuring signals to be filter is measured along measuring paths which have a relative distance a=(r·cos $\psi_i$·$\Delta\psi$). A second subgroup, which is measured in the opposite direction, is consequently not interleaved with the first subgroup before the filtering. The filtering can thus be started as soon as the source 1 (FIG. 2) has been rotated through an angle $\theta = \alpha$ (apical angle of radiation beam) because then all the measurement values of a first subgroup have already been measured. The first filtered subgroups are stored until the associated second subgroups have been measured and filtered, after which the first subgroup and the associated second subgroup are interleaved (the filtered measurement value of a subgroup is in a position between two measurement values of the other subgroup). Such a composite overall group consequently would also be obtained if the measurement values had been interleaved before the filtering and had been processed by means of a filter, the response curve of which is indicated in FIG. 3 by lines 31 and 31'. This can be seen as follows. A group of measurement values obtained according to the prior art (relative distance is filtered with filtering coefficients (group I) $f_0$, $f_1$, $f_2$, ... $f_N$, $f_N$ being the Nyquist frequency and being determined by $(2a)^{-1}$ (straight line 31 in FIG. 3). If the distance between the measurement values should be $\frac{1}{2}$·a, the Nyquist frequency is 1/a (straight line 33, FIG. 3). If now a first subgroup of measurement values is filtered according to the invention with the coefficients $f_0$, $f_1$, $f_2$, ... $f_N$ and if afterwards a subgroup filtered in the same manner is interleaved therewith, the subgroups in fact have been filtered with the coefficients $f_0$, 0, $f_1$, 0, $f_2$, 0, ... $f_N$, the Nyquist frequency $f_N$ being 1/a and the coefficients $f_1$, $f_2$, etc. being associated with frequencies which are two times higher than the frequencies associated with the coefficients $f_1$, $f_2$ etc. of the group I.

After having been interleaved, the filtered measurement values are backprojected in a manner known per se. It should be noted that in this case the first filtered subgroups of measuring signals should be stored, which requires storage space and waiting time. The backprojection of the first two interleaved subgroups can be started as soon as the second subgroup, which is antiparallel to the first subgroup, has been composed and filtered. However, the speed at which such a second subgroup is filtered is four times higher than in case the the subgroups should have been interleaved before the filtering. The gain to be achieved consists in that the subgroups still to be filtered are processed more rapidly. Processing can be effected simultaneously during the backprojection of subgroups which have been filtered beforehand and subsequently interleaved.

Each filtered subgroup can be backprojected without being interleaved with an associated filtered subgroup. The values "0" should then be interposed between each pair of filtered measurement values of each subgroup. In this case the overall calculating time for carrying out the backprojection will be doubled.

Figure 4:
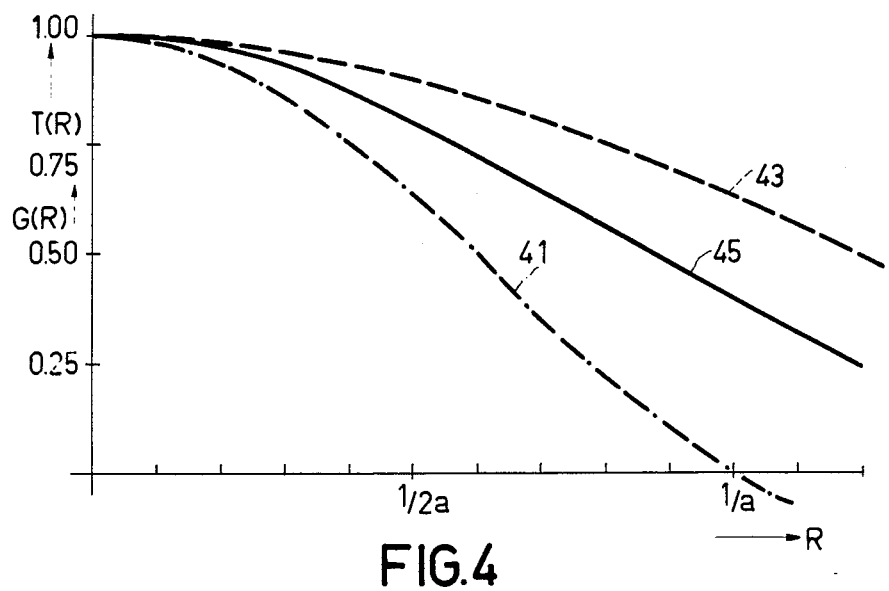
FIG. 4 shows frequency response curves of different backprojection devices.

Information in the image matrix has thus been subjected to an overall frequency filtering which is the product of the frequency response curves of the filtering device, the backprojection device and the image matrix. A convolution of a triangular function is carried out on the filtered measurement values if the filtered measurement values to be backprojected are subjected to a linear interpolation. A convolution in the spatial domain can also be considered as a filtering with a filter T(R) in the frequency domain. The triangular function has a frequency response curve which is determined by $T(R) = \text{sinc}^2(\pi \cdot \frac{1}{2} a \cdot R)$; where a is the base width of the triangle. In FIG. 4 this curve is indicated by line 45. Linear interpolations in the backprojection of the filtered measurement values lead to an essential unavoidable attenuation of the higher spatial frequencies.

The filtered measurement values are backprojected onto the image matrix. The size of the elements of the image matrix is determinative of the maximum spatial frequency imaged. If the size of a square image element is P, the frequency response curve of the image matrix is the Fourier transform G(R) of the block "P": $G(R) = \text{sinc}(\pi \cdot P \cdot R)$. In FIG. 4 the frequency response curve 41 of the image matrix with image elements P is shown (the distance P being assumed to be equal to the value a). If the image matrix has an element size ½P, this image matrix has a frequency response curve G(R)·sinc(π·P·R/2) indicated by a broken line 43. An image matrix with elements ½P requires a memory having a four times more memory cells than a matrix with elements P.

Figure 5A:
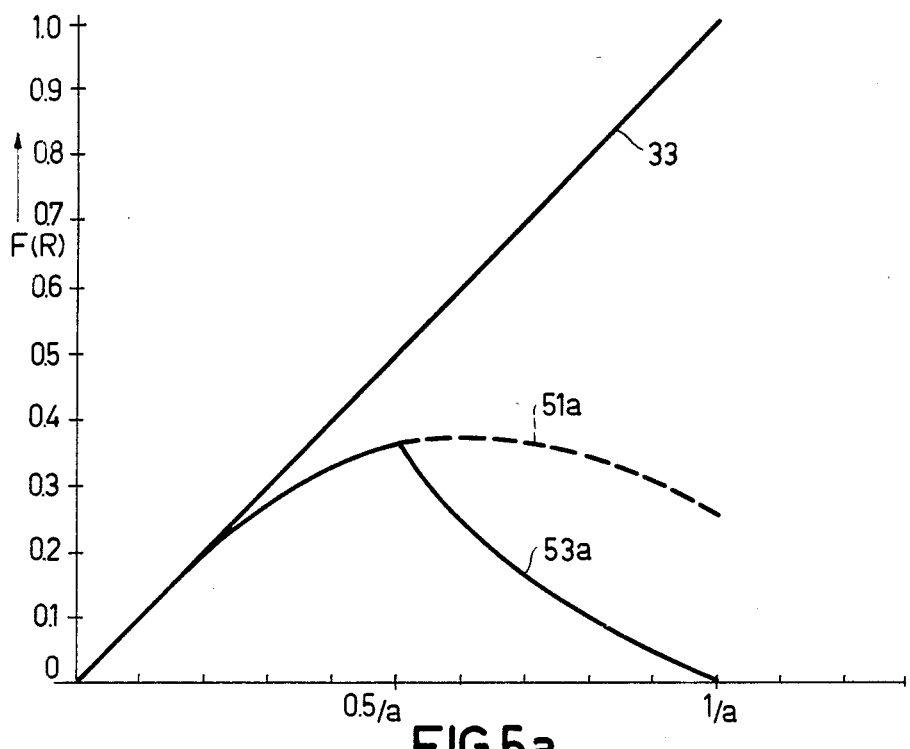
FIGS. 5a and 5b show frequency response curves of a computed tomography device according to the invention and of such a device according to the prior art.

If the values of the antiparallel subgroups are interleaved before filtering (with a cutoff frequency 2/a) and are backprojected after filtering (T(R)=sinc²(π·a/2·R)) in an image matrix having an image element size ½a (curve 43, FIG. 4), the overall response curve will have a variation as indicated by the broken line 51a in FIG. 5a. The overall filtering behaviour of the computed tomography device is determined by the product F(R)=Q(R)·T(R)·G(R) of the frequency response curves of the convolution filter Q(R); the filter T(R) attributable to the interpolation and the filter G(R) attributable to the frequency limit the influence of the image matrix.

If the subgroups of measuring signals in the device according to the invention are filter before first being interleaved (curves 31 and 31', FIG. 3), the overall response curve will have a variation as indicated by line 53a in FIG. 5a. It has been found that for frequencies small than 0.5/a no loss occurs. However, the loss for the frequencies between 0.5/a and 1/a is not essential because these frequencies carry along "noise signals". In the device according to the invention, in which the measurement values are filtered immediately after measuring by means of a filter with a cut-off frequency of 1/a, an image with a high resolution is obtained an the noise is suppressed. A saving in calculating time is also realized and the waiting time from the beginning of the measurement to the beginning of the filtering data is shortened.

Figure 5B:
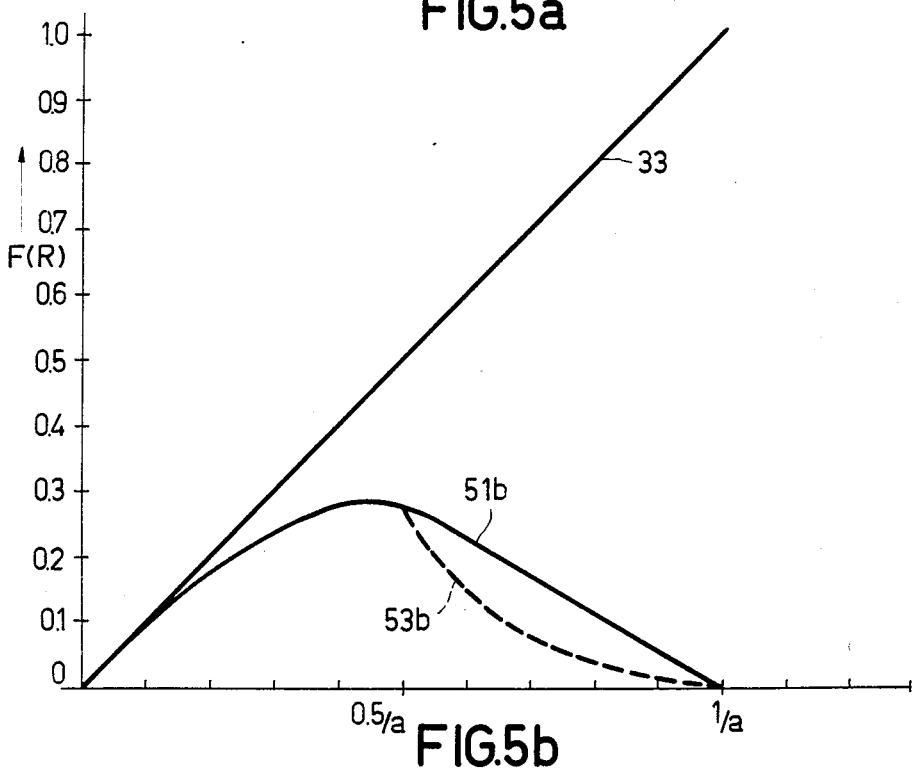

If the filtered measurement values are backprojected onto an image matrix having as image element size a, G(R)=sinc(π·a·R) (curve 41, Figure). The filtering behaviour F(R) of the convolution device according to the invention is then as indicated by the curve 53b in FIG. 5b. The comparable filtering behaviour of a device according to the prior art is indicated by the curve 51b. It can been seen that the behaviour of the device according to the invention with respect to the high frequencies (0.5/a) does not substantially deviate from the device of the prior art.

In the above description of the frequency-limiting properties of computed tomography devices, the distance a between the various measuring paths has been taken into account but the width of the beam of X-ray radiation has not. If it is assumed that the width of such a beam a along a measuring path at the area of the centre of rotation 9 is a, such a beam will have a frequency-limiting behaviour B(R)=sinc(π·a·R). The curves 51a,b and 53a,b from FIGS. 5a and 5b should then be multiplied by B(R) so that the difference between the curves 51a and 53a and between 51b and 53b becomes smaller for the frequencies between 0.5a and 1/a.

In the example described above, a so-called "Ramp" filter was used for filtering the subgroups. However, the invention is not limited to this filter and can be used equally effectively in computed tomography devices in which the high-frequency content of the measuring signals is attenuated (this is the case in devices in which the so-called "Shepp" filter is utilized), see, for example, I.E.E.E. Trans. Nucl. Science, NS-21, 21-43, 1971. In such devices, the overall frequency response curves for high frequencies will located closer to each other.

What is claimed is:

1. In a method of computed tomography which comprises the steps of:

irradiating a plane through a body with a flat, fan-shaped beam of penetrating radiation which lies in the plane, the beam being sequentially directed through the body from a plurality of source points which are uniformly distributed around the body on a circle which lies in the plane;

measuring the values of the attenuation of the radiation along a plurality of measuring paths which lie in the beam and diverge from each of the source points, each of the measuring paths subtending an angle $\Delta\psi$, a centermost measuring path in the beam having a center line and being disposed so that from each source point said center line forms an angle $\psi_i$ with the line which connects the center of the circle to the source point, the centermost measuring path further having a width, a, measured along a line which is perpendicular to the center line and passes through the center of the circle;

forming subgroups of the measured attenuation values wherein each subgroup includes all attenuation values which were measured along a corresponding set of parallel measuring paths;

filtering each subgroup of values, by either convolution or Fourier transformation, followed by frequency filtering and Fourier back-transformation; and then backprojecting the filtered values into an image matrix; the improvement wherein:

each subgroup of values includes only values which were measured in a single direction along parallel measuring paths;

for each of the subgroups of values there is a corresponding subgroup of values which were measured in the opposite direction along parallel paths;

within each subgroup the distance between two adjacent measuring paths is greater than a/2 and less than or equal to a;

the filtering step comprises filtering the values with a filter which has a transfer function response having a maximum value at the frequency $(2a)^{-1}$ and zero points at frequencies 0 and 1/a; and further including the step of interleaving values from the pairs of corresponding subgroups after the filtering step and before the backprojection step; and the backprojection step includes backprojecting the interleaved data from each pair of corresponding subgroups and is performed with an interpolation distance of a/2.

2. In a device for determining a radiation attenuation distribution in a plane which passes through a body, comprising:

source means for producing a flat, fan-shaped beam of penetrating radiation which irradiates the body along a plurality of measuring paths which diverge from a plurality of source points which are regularly distributed around a circle which surrounds the body in the plane;

a group of detectors for detecting radiation in the beam which has passed through the body along the measuring paths and for supplying signals which are a measure of the attenuation of the radiation in the body along each of the measuring paths, wherein the group of detectors being disposed opposite the source means so that radiation emitted from the source and passing through the center of the circle, strikes a centermost detector in the group at a point between the center of the detector and the edge of the detector and wherein each measuring path has a width, a, measured along the line which is perpendicular to the center line of the measuring path and passes through the center of the circle;

calculating means which include a memory, said memory including an image matrix, for storing the value of the signals and means for grouping the values of the signals into subgroups wherein each subgroup includes all values of attenuation which were measured along a corresponding set of parallel measuring paths;

calculating means which include means for forming a convolution or Fourier transformation, frequency filtering means, and Fourier back-transformation means operatively connected to filter each subgroup of signals;

backprojection means for distributing and adding values of the filtered signals over and into the image matrix, display means for displaying an image whose pixels comprise the contents of the image matrix;

the improvement wherein:

the calculating means include means for associating the subgroups into pairs wherein each pair includes corresponding subgroups of attenuation values which were measured in opposite parallel directions;

the filtering means has a transfer function which has a maximum value for a frequency $(2a)^{-1}$ and zero points at the frequencies 0 and $1/a$;

the distance between adjacent measuring paths in each pair of subgroups is greater than $a/2$ and less than or equal to a;

the backprojection means includes means which interleave each pair of filtered signals prior to backprojecting said values into the image matrix and which distributes said interleaved values into the image matrix with an interpolation distance $a/2$; and the number of memory cells in the image matrix is larger than the number of detectors in the group.

3. A device as claimed in claim 2, wherein the number of memory cells is about four times the square of the number of detectors which are spanned by the beam.

* * * * *